United States Patent Office 2,993,022
Patented July 18, 1961

2,993,022
COMPOSITIONS USEFUL IN THE PREPARATION OF DESTATICIZED MOLDED ARTICLES, PROCESS OF PREPARING SAME AND MOLDED ARTICLES PREPARED THEREFROM
Myron A. Coler, 56 Secor Road, Scarsdale, N.Y.
No Drawing. Filed Aug. 24, 1956, Ser. No. 605,943
14 Claims. (Cl. 260—32.6)

This invention relates to articles molded from thermoplastic synthetic resins and in particular to such articles which are relatively free from the accumulation of electrostatic charges, and to the method of making such articles. More specifically, the invention relates to a new product which may be combined with conventional plastic molding materials to provide molded plastic articles having desirable non-electrostatic properties. The term "synthetic resin" and "plastic" as used herein embraces any one of a large and varied group of materials commonly referred to as plastics and resins, such as polymethylmethacrylate, polyvinylidene chloride, polyethylene, polystyrene, polyvinylchloride, polybutadienes, and combinations thereof produced by copolymerization or by mechanical mixing.

Most molded articles made from the above mentioned materials have electrostatic charges built up upon ejection from the mold. The presence of the charges causes the attraction of dust, lint and other fine debris which render the article unsightly. Invariably, attempts to wipe the article so that it may be displayed for sale results in the generation of additional static charges with resultant dust attraction and scratching of the surface unless specifically treated cloths and extreme care are used.

The need for amelioration of the dust collecting tendencies of plastic articles has long been appreciated as evidenced by the extensive literature on the subject.

In general, the approaches of the prior art include the surface treatment of the molded article which is objectionable since a coating is provided which may inherently be undesirable; such a coating is of a temporary nature, and requires an additional handling operation. The beneficial effects of such treatments are basically temporary and exhibit poor resistance to ordinary wear and tear of everyday use such as washing with soap and water.

A still different prior approach has been the direct incorporation of an antistatic material with the plastic molding material. In general it is current knowledge in the industry that if sufficient material is incorporated in this manner to provide even a minimum level of static dissipation, the properties of the plastic are adversely affected as by weakening of the structure.

This invention does not require treatment of the molded article. In turn, this invention provides a means of incorporating a destaticizing agent into the article so efficiently that an extremely small quantity can produce a destaticized molded plastic article without producing undesired changes in the physical properties of the plastic. Further, it has been found that the product of this invention retains antistatic properties for long periods despite washing with soap and water.

Accordingly, it is an object of this invention to provide a plastic article substantially non-susceptible to the accumulation of electrostatic charges.

Another object is to provide a material for incorporation with a plastic molding powder which will render a resulting molded article free of the effects of electrostatic charges.

It is a specific object to provide an additive for a plastic comprising a gel coated carrier particle having imbibed in the gel an antistatic agent.

Still another object is to provide a method of making a static dissipating plastic article.

A still different object is to provide a simple low cost method of producing static dissipating molded plastic articles.

It is a particular object of this invention to provide a plastic molding composition for injection molding articles having antistatic properties.

A further object is to provide a liquid-containing conductive material for incorporation with comminuted plastic particles such that the liquid is not readily expressed in molding.

Another object is to provide a method for making a material suitable for incorporation into synthetic resins to produce antistatic compositions.

Still further objects and advantages of this invention are made apparent by the following description.

In copending applications of Myron A. Coler and Arnold S. Louis for Non-Electrostatic Plastic Articles, Serial No. 291,815 filed June 4, 1952 and Non-Electrostatic Plastic Articles and Method of Making Same, Serial No. 295,838 filed June 26, 1952, both now abandoned, it is disclosed that by treating certain finely divided sorptive materials with appropriate destaticizing materials, in liquid form, the treated sorptive materials may be mixed with comminuted plastic particles and molded to produce static dissipating plastic articles. It was also found that the resulting articles have a surprisingly high conductivity in relation to the amount of conductive material incorporated therein; and thus, by this technique it is possible to produce plastic products having relatively good static charge dissipation properties but structural properties substantially the same as those of the untreated plastic. The molding powder which results may be formed by conventional molding techniques into any of various desired solid void-free shapes.

The present invention is an improvement over the referenced copending applications. I have found that by utilizing a gel material in conjunction with the sorptive material beneficial results are obtained, improved retention of the destaticizing liquid and a corresponding increase in the destaticizing characteristics of the molded article being noted.

In the present application and particularly in the appended claims, the phrase "plastic in comminuted form" is used. It should be noted that the word "comminuted" merely indicates that the plastic is in a discrete particulate form and does not necessarily imply that this particulate form was arrived at by subdivision of larger plastic masses. Similarly, phrases such as "finely divided materials" are not intended to carry any implication as to the manner in which the fine state of subdivision is arrived at.

The term "sorptive" as used herein is intended to embrace absorption, adsorption and other like processes by which a solid material and a liquid co-adhere.

Suitable sorptive materials are those having the ability to hold considerable quantities of liquid destaticizing material under conditions of molding. They may be organic or inorganic and should have a large specific surface which may reside, in part, in extensive internal pores. Generally, finely divided sorptive materials are preferred for the greater surface as compared to an equivalent quantity of coarser material. They should be stable under molding conditions and substantially non-reactive with the destaticizing material, plastic, or gel nor should they be soluble in them. The sorptive material should be readily wetted by the conductive material. Any finely divided solid material meeting these conditions would be suitable. Such materials include: Lead carbonate, lead sulfate, zinc oxide, lead oxide, titanium oxide, antimony oxide, silicon dioxide, calcium sulfate, zinc sulphide, barium sulfate (including barytes), calcium carbonate (including limestone flour), magnesium silicate, aluminum silicate, calcium oxide, cadmium sulfide, toluidine red, para red, lead chromate, zinc chromate, chromium oxide, antimony sulfide, zinc borate, mercuric oxide, strontium chromate, cuprous oxide, calcium chromate, lead thiosulfate, mica, talc, bentonite, clay, alumina hydrate, iron oxide pigments.

Some sorptive materials may serve a dual purpose; for example, they may serve as coloring pigments. Specifically, titanium dioxide, copper phthalocyanine, cadmium reds and yellow, chrome yellow and other white and colored materials in pigment form may be used. Diatomaceous earth is useful as a sorptive material for translucent conductive compounds if a translucent destaticized plastic is desired. Wood flour, alpha cellulose, asbestos fibers and like finely divided filler materials can likewise serve as sorptive materials within the intent of this application.

It should be noted that as normally compounded (e.g., by extrusion and chopping) in filled plastics, i.e., those containing such fillers, the fillers are not in a condition to receive the liquid destaticizing material.

Preferred destaticizing materials are those which are liquid under molding conditions, are electrically conductive, are non-reacting with the plastic gel or sorptive material, are stable under molding conditions, and have low vapor pressure so as to minimize loss during molding as well as from the molded article. It is important that the destaticizing material be substantially insoluble in the plastic and/or the sorptive agent, and in turn, be substantially free of solvent properties for the same materials.

The destaticizing agent may be inherently conductive or it may be a material that is rendered conductive by the ionization of a dissolved electrolyte. The resistivity should not exceed $10^{11}$ ohm-cm.

In this latter connection, I have found it is generally helpful to use organic liquids of high dielectric constant. Specifically, if the dielectric constant is greater than 25, as I prefer, substantially all of the advantageous properties herein described are secured in full measure. The dielectric constant should be at least 12, below which limit the advantages of this invention are in general only feebly secured, if at all. However, it is to be noted that a few specific compounds of dielectric constant of about 5 are suitable.

The aforementioned values of dielectric constant were determined by first balancing a given condenser of open plate construction against a calibrated variable standard capacitor using a current whose frequency was 10,000 cycles per second to determine its initial capacity. The same capacitor was then immersed in the liquid of unknown dielectric constant and again balanced against the standard, the resistive component of the dielectric liquid being at the same time balanced out by means of a calibrated variable resistor connected in parallel with the standard condenser. The ratio of the latter measured capacity to the initial capacity of the condenser is taken to be the dielectric constant of the liquid in question. The test condenser must, of course, be cleaned scrupulously before each measurement.

Types of destaticizing liquids which have been found to be particularly useful in the practice of this invention include the amides, nitriles, nitro compounds and polyhydric alcohols. In general, the effectiveness of the active groups just mentioned decreases with the increasing size of attached alkyl or aryl radicals. The criterion of dielectric constant previously mentioned is preferred however as defining those substances which may be used to advantage as conductive materials for the purposes of this invention. The liquid should have a relatively low vapor pressure, otherwise the conductive material will evaporate during storage, particularly at high temperature and its beneficial effects will be lost. Thus, while water answers the criterion of dielectric constant set up herein for the selection of conductive materials, it has been found that moldings containing water as the destaticizing material, lose their static dissipating properties after a few days storage at 113° F. presumably because of evaporation of the water.

Upon cooling some lyophilic sols, for example, gelatin, pectin or agar in water, or a moderately concentrated soap solution, or upon adding electrolytes, under suitable conditions, to certain lyophobic (or intermediate) sols, for example, hydrous ferric or aluminum oxide or silica, the whole system sets to an apparently homogeneous "gel" or "jelly." Gel formation sometimes occurs when attempting to prepare relatively concentrated solutions of linear high polymers, for example, rubber in benzene and polystyrene in toluene. Branched-chain polymers, involving molecules with three or more functional groups, set to gels when the extent of polymerization exceeds a critical value. The process of gel formation is referred to as "gelation." In general, the transition from sol to gel is a gradual process, as is shown by the variation in physical properties, for example, refractive index of a gelatin sol and the conductance and vapor pressure of soap solutions. Gelation is, of course, accompanied by a large increase of viscosity but even this probably takes place gradually rather than suddenly.

Gels may be broadly divided into those that are elastic and those that are non-elastic or rigid. Actually, all gels possess appreciable elasticity, and the description used refers more particularly to the property of the product obtained when the gel is dried. Partial dehydration of an elastic gel such as gelatin gel, leads to the formation of an elastic solid from which the original sol may be regenerated upon addition of the solvent. Such dry or semi-dry solids are known as "xerogels." Non-elastic gels, on the other hand, such as those of the inorganic hydrous oxides, become glassy or fall to a powder and lose nearly all their elasticity upon drying. The sols cannot be obtained upon mere addition of water to the dry or partially dry solid. It is intended that as used herein, the term "gel" is intended to exclude the "non-elastic gels" in their dried form.

I have discovered that by incorporating a gel material with the liquid, the sorptive material effectively retains relatively highly volatile materials for long periods, despite the rigors of the molding process.

Gel materials which are suitable in carrying out the teachings of this invention include: polyvinylalcohol, gelatin, pectin, agar, methylcellulose, the gelatinous form of silica gel, hydrated aluminum and magnesium hydroxides, other proteinaceous materials such as casein and zein, soaps such as aluminum hydroxy stearate, and gel materials made by the hydrolysis of alkyl titanates or silicates. It is preferred that freshly precipitated gel materials be utilized.

Indeed, it is preferred that the gel material be precipitated in the destaticizing liquid after the latter has been sorbed on the sorptive material as will be described in greater detail hereafter.

Plastic emulsions or latices can be used to prepare gel materials.

Another preferred method of incorporating the gel material is to steep or suspend the sorptive material in a colloidal solution of the gel material in the destaticizing liquid, thereafter at least partially drying the combination, as for instance by spray-drying so that there are formed particles of sorptive material carrying destaticizing liquid which is involved in a gel structure.

Alternatively the gel may be dried quite completely and later made to imbibe destaticizing liquid as for instance by immersion.

Be it observed that where the gel is such as to form a rigid or semi-rigid structure, it is to be distributed on and in the sorptive particles before the said structure develops.

It should be understood that many liquids which have high dielectric constants are inherently non-conductive but are rendered conductive by the presence of small amounts of ionizable materials. Usually such ionizable substances are present as normal impurities in the commercially available forms of the liquids. Ionizable impurities may also be derived from the plastic or sorptive particles which are used or by absorption from the air.

Throughout the specifications and claims of this application, whenever electrically conductive liquid materials are mentioned, the commonly available technical grade of these materials is intended. In using grades of greater purity containing an inadequate amount of ionizable material, the deficiency can, if necessary, be eliminated by deliberate addition of such ionizable material.

It should be observed that an organic liquid of low or moderate dielectric constant can be upgraded by the incorporation of water or other liquid of high dielectric constant. The dielectric constant criterion for a suitable destaticizing liquid given above is to be applied to such combinations in their entirety.

Among suitable destaticizing agents are water-soluble compositions having a vapor pressure not more than 760 mm. at 100° C. and a dielectric constant greater than 5, said agents including hydroxyalkylated alkylene diamines wherein the alkylene radicals contain from 2 to 6 carbon atoms and the hydroxyalkyl radicals contain from 2 to 8 carbon atoms; hydroxyalkylated polyethylene polyamines wherein the polyethylene radicals contain 2 to 4 ethylene groups and the hydroxyalkyl radicals contain 2 to 8 carbon atoms; polyalkanolamines containing no cyclic groups and at least two hydroxyalkyl groups containing from 2 to 8 carbon atoms; carboxyalkylated alkylene polyamines containing no more than 5 nitrogen atoms wherein the alkylene groups contain 2 to 6 carbon atoms and the carboxyalkyl groups contain 2 to 8 carbon atoms; acid salts and quarternary ammonium salts of any of the aforementioned agents; esters of any of said additives with alkyl groups containing no more than 4 carbon atoms; compounds resulting from the condensation of ethylene oxide with a hydrophobic base formed by the condensation of propylene oxide with propylene glycol represented empirically by:

$$HO-(C_2H_4O)_a(C_3H_6O)_b(C_2H_4O)_cH$$

wherein the percentage of polyoxyethylene in the total molecule is less than 85% and the molecular weight of the polyoxypropylene hydrophobic base is from about 800 to about 3000; products of the sequential addition of propylene oxide and ethylene oxide to ethylene diamine wherein the molecular weight of the initial addition product between propylene oxide and ethylene diamine has a molecular weight greater than 2000 and said product of sequential addition contains more than 60% by weight of oxyethylene groups; and esters of aliphatic dibasic acids having the formula:

in which R is an aliphatic carbon chain carrying at least one sulphonic group but free from other substituents, and X is hydrogen or an alcohol or phenol radical not connected by a carbon to carbon bond with R, at least one X being such an alcohol or phenol radical, and Me is hydrogen or a base.

Suitable destaticizing agents include viscous materials which are liquid at normal molding temperatures such as the polyethylene glycols. Other specific materials include:

Totally hydroxy propylated ethylene diamine
Totally hydroxy propylated ethylene diammonium diacetate
Totally hydroxy propylated butylene diammonium bisulfate
Totally hydroxy ethylated propylene diammonium phosphate
Totally hydroxy propylated diacetate
Totally hydroxy propylated ethylene diammonium phosphate
Totally hydroxy octylated hexamethylene diammonium bisulfate
Totally hydroxy propylated ethylene dimethyl diammonium dichloride
Totally hydroxy octylated ethylene dimethyl diammonium dichloride
Totally hydroxy propylated ethylene amine ethyl ammonium chloride
Totally hydroxy propylated propylene amine ammonium phosphate
Totally hydroxy propylated butylene dibenzyl diammonium phosphate
Totally hydroxy propylated trimethylene diethyl diammonium phosphate
Totally hydroxy propylated ethylene dimethyl diammonium dichloride
Totally hydroxy ethylated propylene dimethyl diammonium sulfate
Totally hydroxy propylated ethylene dimethyl diammonium sulfate
Totally hydroxy propylated ethylene dimethyl diammonium chloride
Totally hydroxy octylated ethylene diamine
Totally hydroxy ethylated hexamethylene diamine
Totally hydroxy propylated trimethylene
Totally hydroxy propylated butylene diamine
Totally hydroxy ethylated butylene diamine
Totally hydroxy octylated hexamethylene diamine
Tri-hydroxypropylated ethylene diamine
Mono-hydroxyethylated ethylene diamine
Tri-hydroxyethylated ethylene diamine
Tri-hydroxyoctylated hexamethylene diamine
Mono-hydroxypropylated ethylene diamine
Di-hydroxypropylated butylene diamine
Tri-hydroxypropylated trimethylene diamine
Mono-hydroxyethylated propylene diamine
Penta-hydroxyethylated diethylene triamine
Totally hydroxyoctylated tetraethylene pentamine
Penta-hydroxypropylated diethylene triamine
Septa-hydroxypropylated tetraethylene pentamine ethyl ammonium chloride
Penta-hydroxybutylated diethylene triamine
Hexa-hydroxyethylated triethylene tetramine
Dioctyl sodium sulfosuccinate
Dihexyl sodium sulfosuccinate
Diamyl sodium sulfosuccinate
Diamyl potassium sulfosuccinate
Dihexyl potassium sulfosuccinate
Dioctyl potassium sulfosuccinate
Totally carboxy methylated ethylene diamine
Totally carboxy septylated tetraethylene pentamine
Sodium salts of totally carboxy methylated ethylene diamine
Tri-carboxy propylated propylene amine ethyl ammonium chloride
Diisopropyl ester of tetra corboxy butylated hexylene diamine
Triisopropanolamine
N-butyl diethanolamine
Tri-octanolamine
Triethanol ammonium acetate
Diacetic acid ester of triisopropanol ammonium acetate
Mono-butyric acid ester of diisobutanol ammonium bisulfate
Diisobutanol amine
Mono-hydroxyethyl trihydroxypropyl ethylene diamine Glycerine
Formamide
Glyconitrile
N-acetyl ethanolamine The aforelisted compounds are only by way of example, and it is to be understood that other materials meeting the previously stated conditions are suitable.

I have found hydrotropic agents helpful in incorporating aqueous systems in organic liquids. Such agents include sodium xylene sulfonate and toluene sulfonic acid.

Wetting agents such as the sodium salts of sulfated long chain fatty alcohols or sodium naphthenate may be utilized to improve wetting of the sorptive material, particularly those materials having fine internal openings.

The proper amount of sorptive material depends in part upon the method by which the plastic is to be made into molded objects.

Where objects are to be formed by compression molding, I have found that the non-electrostatic plastic should contain from 3 to 60% of sorptive material and preferably from 5 to 25% of sorptive material by volume based on the quantity of insulator plastic present.

According to these limits the non-electrostatic plastic should contain 3 to 37% and preferably 5 to 20% of sorptive material by weight.

Where objects are to be formed by injection molding, the non-electrostatic plastic should contain from 3 to 60% of sorptive material, preferably from 5 to 30% of sorptive material by volume based on the quantity of insulator plastic present.

According to these limits the non-electrostatic plastic for injection molding should contain 3 to 37% and preferably 5 to 23% of sorptive material by weight.

The proper amount of destaticizing material to be used is apparently a function of the sorptive factor which is readily determined as follows:

15 grams of sorptive material are placed in a 600 cc. Ehrlenmeyer flask. Liquid is added in small measured quantities with intensive shaking until just sufficient liquid has been added to collect the sorptive material into a single ball-like mass. The sorptive factor, S, is then $S = L/C$ where L is the weight of liquid added and C is the weight of sorptive material used.

I have found that the proper amount of destaticizing material depends in part upon the method by which the plastic is to be made into molded objects.

Where objects are to be formed by compression molding, I have found that the non-electrostatic plastic should contain not more destaticizing material than is given by the expression $L = SC$.

If a greater quantity of destaticizing material is used, the resultant molding will be objectionably wet or its physical properties may even be impaired.

In order that a wet feeling of the molded article may be avoided, it is preferred that the amount of destaticizing material used be held to $1/8$ to $1/2$ the quantity defined by the above equation.

According to these limits the non-electrostatic plastic should contain no more than 36% and preferably 0.3 to 22% by volume of conductive material.

Where objects are to be formed by injection molding or by molding at elevated temperatures, I have found that greater allowance should be made for volatilization of destaticizing liquid than in the case of compression or lower temperature molding. I have found that injection molding requires that the non-electrostatic plastic contain more destaticizing material and that this requirement is satisfied when the non-electrostatic plastic contains 0.5 to 40%, preferably 1.5 to 25% by volume of the destaticizing material.

The quantity of gel material to be incorporated will depend upon the particular plastic, combination of gel material, destaticizing agent and sorptive material used.

In general, the quantity of gel material should be such as to render the destaticizing liquid relatively immobile. With most of the commonly used gel materials it will be found that the addition of 1 to 10% by weight of the gel material based on the destaticizing liquid will be effective. It should be noted that many of the gel materials mentioned above are themselves conductive or by reason of their composition and method of preparation will contribute ions to the conductive liquid.

In the molding of objects from the non-electrostatic plastics of this invention, it is preferred that a temperature in the lower part of the usual molding range for the corresponding insulator plastic be used in order to minimize vaporization losses of the conductive material.

The plastics which can be used in carrying out this invention may be chosen from the large group of thermoplastic substances including polystyrene, polymethylmethacrylate, polyethylene, polyvinylchloride, polyvinylidenechloride, copolymers and mixtures thereof. This listing is not intended to be limiting. The plastic particles may already contain compounding ingredients such as lubricants, plasticizers, dyes, pigments and fillers, like alpha-cellulose, wood flour and mica.

It is preferred that the treated sorptive material be mixed with the comminuted plastic molding materials under conditions which minimize the insulation of the sorptive material by the plastic.

Treatment of the sorptive material and mixing with the comminuted plastic may take place simultaneously if desired.

The gel material may be dispersed colloidally or preferably freshly precipitated in the destaticizing liquid and the resulting combination sorbed on the sorptive material prior to or simultaneously with mixing with the comminuted plastic.

Also, one reagent for the gel material may be dissolved in the destaticizing liquid and the combination used to treat the sorptive material prior to or simultaneous with mixing with the comminuted plastic. Thereafter, the combination is treated with a precipitant whereby the gelatinous material is formed intimately with the sorbed destaticizing liquid.

Where the gel material is such as may be reversibly dried from and colloidally dispersed in the destaticizing liquid, the gel material may be added to the dry state to the destaticizing liquid prior to treatment of the sorptive material or may be added dry to the total charge of comminuted plastic sorptive material and destaticizing in the mixing operation.

When the gel material is formed by precipitation in the destaticizing liquid separately or in the sorbed state, conditions should be chosen so that the gel material is not formed in the sol state. For many colloidal substances appropriate conditions for gel formation will be found in standard works on colloid chemistry and are well known to those skilled in the art.

In order to point out more fully the nature of the present invention, the following examples illustrate procedures which may be used in the preparation of antistatic plastics of this invention.

*Example 1*

20 grams of polyvinyl alcohol of high purity and high molecular weight was dissolved in 1 liter of water at a temperature of 180° F. by slowly adding the polyvinyl alcohol while stirring until solution was complete. 13 grams of formamide was then dissolved in the solution and 130 grams of pigment grade $TiO_2$ suspended in the resulting solution.

The above suspensions was spray-dried, the suspension spray being intimately intermingled with a spray of 2% borax solution. Drying conditions were adjusted so that a finely divided powder resulted which was just moist to the touch on exerting pressure and which contained most of the originally added formamide.

The treated carrier prepared in the previous paragraphs was combined with polystyrene by tumbling 40 grams of the treated pigment, 100 grams of polystyrene sized to pass a 40 mesh screen and be retained on an 80 mesh screen and 1000 grams of one inch porcelain balls in a one gallon jar mill for one hour at 60 revolutions per minute.

*Example 2*

The procedure of 1 was repeated using triisopropanolamine in place of the formamide. Improved destaticizing properties were noted.

*Example 3*

Another procedure for preparing antistatic plastics of this invention is as follows: 600 grams of silica and 40 grams of a 3.6% aqueous solution of aluminum chloride hexahydrate were tumbled in a one gallon jar with 2000 grams of one inch porcelain balls at 60 revolutions per minute for one hour. 10 grams of a 10% aqueous solution of soda ash was then added and tumbling continued for a second hour.

20 grams of the resulting treated carrier, 100 grams of the polystyrene beads mentioned above and 2000 grams of one inch porcelain balls were then charged to a one gallon jar and tumbled at 60 revolutions per minute for an hour. The resulting compound was molded to yield an antistatic product.

*Example 4*

The procedure of Example 3 was repeated with 8 grams of totally hydroxypropylated ethylene diamine added to the treated carried and polystyrene beads during the tumbling operation. The resulting composition yielded excellent moldings.

*Example 5*

Still another procedure for the preparation of destaticized plastic is illustrated by the use of 1000 grams of a colloidal solution of silica (marketed under the trade name "Ludox") containing 200 grams of $SiO_2$. With this was mixed 1000 grams of pigment grade $TiO_2$. Next was added a solution of ammonium chloride in such quantity as to cause the silica to gel. The whole was spread out in a pan, dried so as to contain 10% of uncombined water, and ground so that all passed a 325 mesh screen. The resulting treated sorptive material was combined with comminuted plastic as described above. When molded the resulting product was slightly destaticized.

*Example 6*

Example 5 was repeated with the addition of the inclusion of 10 grams of dioctyl sodium sulfosuccinate to 100 grams of polymethylmethacrylate and 30 grams of the silica gel in the tumbling operation.

When the resulting composition was molded a destaticized article resulted.

*Example 7*

Illustrative of a useful procedure, 100 grams of polystyrene beads as described above, 8 grams of N-acetyl ethanolamine, 40 grams of silica and 2.5 grams of a water suspension containing 5% of a freshly precipitated silica in gel form was charged to a one gallon ball mill with 2000 grams of one inch porcelain balls and milled for one hour, at 60 revolutions per minute. The resulting compound was molded to yield antistatic articles.

This application is a continuation-in-part of my copending application entitled "Anti-Static Plastic Product and Method of Making Same," filed July 15, 1952, Serial No. 299,021, now abandoned.

Since many embodiments may be made of the present invention, and since many changes might be made in the embodiment disclosed herein, it is to be understood that the foregoing description is to be interpreted as illustrative only and not in a limiting sense.

What is claimed is:

1. A product adapted for molding destaticized articles consisting essentially of a finely divided resinous synthetic organic thermoplastic molding polymer and solid particles of a non-resinous sorptive carrier, sorptively coated with an electrically conductive composition, said coated carrier particles being distributed throughout said polymer; said sorptive carrier material constituting between about 3% and 37% by weight of the polymer, and said coating consisting essentially of destaticizing material and gel, the amount of destaticizing material being between about 0.5% and 40% by weight of the polymer, and the amount of gel being between about 1% and 10% by weight of the destaticizing material; said destaticizing material being characterized by: a low vapor pressure at temperatures up to the temperature at which said polymer is to be molded, stability at the molding temperature and pressure at which said polymer is to be molded, being a liquid at molding conditions for said polymer, insolubility in the polymer and in the non-resinous sorptive carrier, freedom from solvent properties for the polymer and non-resinous sorptive carrier, and an electrical resistivity of less than $10^{11}$ ohm-cm.; said non-resinous sorptive material being characterized by: a large specific surface, an ability to retain a substantial quantity of liquid destaticizing material as a sorptively held coating when subjected to the elevated pressure and temperature incident to molding said polymer, stability under said molding conditions, an ability to be wetted readily by the electrically conductive material and a chemical inertness toward and an insolubility in the destaticizing agent, gel and polymer and said gel being an elastic gel at the time of incorporation into said composition and being further characterized by a chemical inertness toward and an non-solvent action on said sorptive non-resinous carrier.

2. The product of claim 1 wherein the non-resinous sorptive carrier is silica.

3. The product of claim 1 wherein the non-resinous sorptive carrier is titanium dioxide.

4. The product of claim 1 wherein the polymer is polystyrene.

5. The product of claim 1 wherein the destaticizing material is formamide.

6. The product of claim 1 wherein the destaticizing material is triisopropanolamine.

7. The product of claim 1 wherein the destaticizing material is totally hydroxypropylated ethylene diamine.

8. A destaticized molded article which consists essentially of a synthetic resinous organic thermoplastic polymer body, non-resinous, sorptive carrier particles distributed through said body and an electrically conductive gel composition present as a coating sorbed on the surfaces of said carrier particles, said article having been produced by molding under heat and pressure, the composition of claim 1.

9. The process of producing a product adapted for molding destaticized articles, comprising sorptively coating the surfaces of solid particles of a non-resinous sorptive carrier with an electrically conductive gel composition, said composition consisting essentially of a gel and a destaticizing material, and distributing said sorptively coated particles throughout a finely divided resinous synthetic organic thermoplastic molding polymer, said sorptive non-resinous carrier material constituting between about 3% and 37% by weight of the polymer and said coating consisting essentially of destaticizing material and gel, the amount of destaticizing material being between about 0.5% and 40% by weight of the polymer, and the amount of gel being between about 1% and 10% by weight of the destaticizing material; said destaticizing material being characterized by: a low vapor pressure at temperatures up to the temperature at which said polymer is to be molded, stability at the molding temperature and pressure at which said polymer is to be molded, being a liquid at molding conditions for said polymer, insolubility in the polymer and in the non-resinous sorptive carrier, freedom from solvent properties for the polymer and non-resinous sorptive carrier, and an electrical resistivity of less than $10^{11}$ ohm-cm.; said non-resinous sorptive material being characterized by: a large specific surface, an ability to retain a substantial quantity of liquid destaticizing material as a sorptively held coating when subjected to the elevated pressure and temperature incident to molding said polymer, stability under said molding conditions, an ability to be wetted readily by the electrically conductive material and a chemical inertness toward and an insolubility in the destaticizing agent, gel and polymer and said gel being an elastic gel at the time of incorporation into said composition and being further characterized by a chemical inertness toward and an nonsolvent action on said sorptive non-resinous carrier.

10. The process of claim 9 wherein the sorptive carrier particles are coated with the conductive gel by treatment with a solution of ionizable organic compound and colloidal gel material.

11. The process of claim 9 wherein the sorptive carrier particles are (1) treated with a liquid organic compound and (2) subjected to the action of a gelling agent so as to form, in situ, a conductive gel on the surfaces of said carrier particles.

12. The process of claim 9 wherein the gel is precipitated in the ionizable organic compound after said compound has been sorbed on the sorptive carrier particles.

13. The process of claim 9 wherein the gel comprises a hydrated metal oxide.

14. The process of claim 9 wherein the gel is polyvinyl alcohol.

References Cited in the file of this patent

UNITED STATES PATENTS

| | | |
|---|---|---|
| 2,090,708 | Stahl | Aug. 24, 1937 |
| 2,263,007 | McNally et al. | Nov. 18, 1941 |
| 2,353,228 | Ducca | July 11, 1944 |
| 2,393,863 | Myers | Jan. 29, 1946 |
| 2,538,900 | Ehrlich | Jan. 23, 1951 |
| 2,624,725 | Bjorksten et al. | Jan. 6, 1953 |
| 2,729,860 | Balkin et al. | Jan. 10, 1956 |
| 2,868,741 | Chambers et al. | Jan. 13, 1959 |